Jan. 16, 1968  MUCHUAN CHEN  3,363,829

FLUID COMPRESSOR DRIVE ANTI-STALL MEANS

Filed Oct. 19, 1965

Inventor.
Muchuan Chen
By
Wilson, Settle, Batchelder
Attys. & Craig

United States Patent Office

3,363,829
Patented Jan. 16, 1968

3,363,829
FLUID COMPRESSOR DRIVE ANTI-STALL MEANS
Muchuan Chen, Detroit, Mich., assignor to American Radiator & Standard Sanitary Corporation, New York, N.Y., a corporation of Delaware
Filed Oct. 19, 1965, Ser. No. 497,907
9 Claims. (Cl. 230—2)

ABSTRACT OF THE DISCLOSURE

The invention provides an anti-stall device in combination with a plurality of fluid compressors in parallel fluid feed lines supplying fluid to a common fluid output and three-phase electrical motors respectively driving the compressors, the anti-stall device preventing stalling of one of the motors as a result of excessive back pressure on the corresponding compressor. The anti-stall device includes a transformer having two primary windings receiving currents of the same phase from two of the motors, the currents being opposed in direction so as to induce a differential current in a secondary winding of the transformer only when there is a difference in magnitude of the currents in the primary windings. A full wave rectifying network is connected to the secondary winding of the transformer for producing a direct current signal in response to the differential secondary current, and a bistable device is coupled to the output of the full wave rectifying network and is responsive to the direct current signal at a threshold level thereof to turn off one of the motors. The anti-stall device may also include a variable impedance for calibrating the current induced in the secondary winding with a predetermined difference in the magnitude between the currents in the primary windings of the transformer, and there may also be a timer-operated shunt across the secondary winding of the transformer for rendering the anti-stall device ineffective for a predetermined time during which the motors are being started.

Background of the invention

This invention relates generally to means for sensing back pressure on a compressor and deactuating a compressor drive responsive to the sensing of back pressure. More particularly, this invention relates to sensing of back pressure against a compressor where a plurality of compressors drive parallel fluid flows toward a common exit flow and the deactuation of the drive on one of these compressors responsive to said sensing.

In the operation of fluid compressors in lines feeding fluid systems, it is desirable to prevent back currents or back pressure in the fluid lines from becoming great enough in magnitude to cause stall of electrical motors driving compressors. When such back pressures reach such magnitudes, not only for undesirable characteristics reflected in the flow of fluid throughout the system, but in addition, the electrical motors driving the compressors are overloaded to the extent of overheating and damaging these motors. Previous attempts to solve this problem by requiring an observer to monitor pressure indicating means in the lines has proved unsatisfactory both in terms of cost and in terms of feasibility of shutting down the compressor drives in rapid enough response to observation of back pressure to prevent damage to the electrical motors. While monitoring of observation of back pressure indicating devices has proved infeasible, no automatic apparatus has yet been provided, previous to this invention, which accomplishes the job in an effective yet expeditious and economical manner.

Objects of the invention

Accordingly, it is an object of this invention to provide a fluid system having a plurality of compressors in fluid lines feeding a common output, where such compressors are driven by electrical motors, with anti-stall means responsive to a predetermined back pressure on the compressors.

Additionally, it is an object of this invention to provide a fluid system having a plurality of compressors feeding fluid lines to a common output with anti-stall means responsive to back pressure against one of the compressors for turning off any one of said motors responsive to said predetermined level of back pressure.

It is a still further object of this invention to provide a fluid system having a plurality of compressors in corresponding parallel fluid feed lines to a common output with means for preventing stall on any of these compressors responsive to a predetermined threshold of electrical load on any one of said compressors.

It is still another object of this invention to provide a fluid system having a plurality of compressors feeding a corresponding plurality of fluid feed lines to a common output with means for preventing the stall of any one of the said compressors due to back pressure by turning off one of said compressors responsive to an increase in electrical load in any one of said compressors without relying on detection of back pressure by means other than the compressor itself in contact with the fluid.

These and other objects of this invention are accomplished by providing transformer primary windings which are fed by opposed currents, each of the currents being from the same phase of a different one of a pair of electrical motors, each of the motors driving a different compressor in parallel fluid feed lines through a common fluid output, secondary windings communicating with a rectifying bridge, and a bi-stable element across the bridge operable to actuate circuitry stopping one of the motors responsive to predetermined threshold of current in secondary windings of the transformer.

Other objects of this invention will appear in the following description and appended claims, reference being had to the accompanying drawing forming a part of this specification.

Before explaining the present invention in detail, it is to be understood that the invention is not limited in its application to the details of construction and arrangement of parts illustrated in the accompanying drawings since the invention is capable of other embodiments and of being practiced or carried out in various ways. Also, it is to be understood that the phraseology or terminology employed herein is for the purpose of description and not of limitation.

Figure 1:
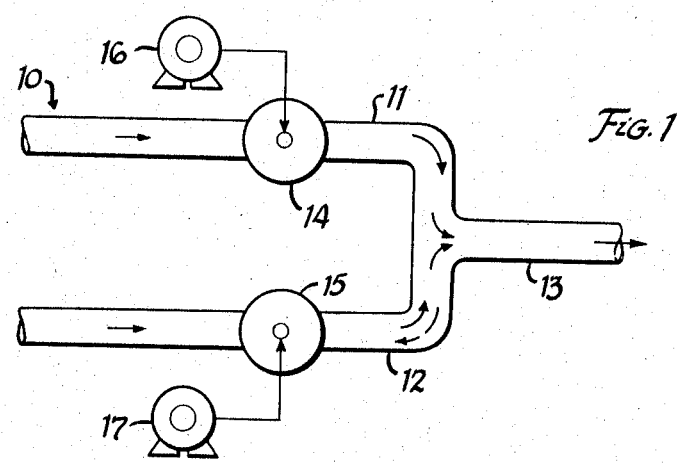
FIGURE 1 is a schematic representation of a pair of fluid compressors in corresponding parallel fluid input lines to a common fluid output being driven by electrical motors to be controlled according to the teaching of the invention.

As shown on the drawings:

In FIGURE 1, a portion of a fluid system is shown generally at numeral 10. This portion of the fluid system comprises a pair of parallel fluid conduit members 11 and 12 feeding a common output member 13. These fluid conduits each have a corresponding compressor 14 and 15 respectively. These compressors are driven by motors shown schematically at numerals 16 and 17 respectively.

Figure 2:
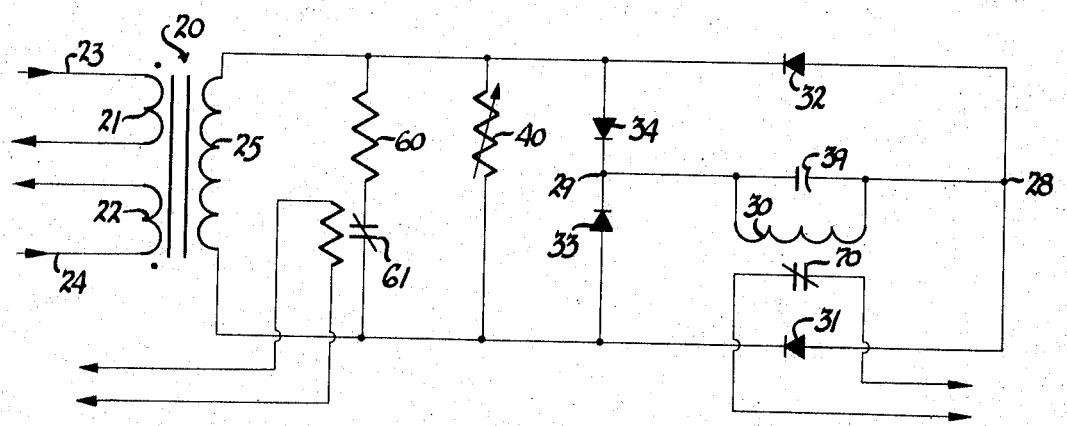
FIGURE 2 is a network for controlling the electrical motor shown in FIGURE 1 shown in schematic form according to the preferred embodiment of this invention.

Referring to the network shown in FIGURE 2, a transformer 20 has a pair of primary opposed polarity coils 21, 22 each being fed by a different mutually opposed currents 23 and 24 respectively. Current 23 is from one phase of the electrical network of the motor 16. Current 24 is from a corresponding phase of the network of the motor 17.

The secondary winding of coil 25 of the transformer 20 has an induced current responsive to a differential of current amplitude existing between the currents 23 and 24. The currents 23 and 24 are opposed in direction. A differential occurring between them inducing current in the secondary coil will not be a differential in phase, but a differential in amplitude. A full wave rectifying network is placed across the secondary windings of the transformer. This full wave rectifying network comprises diodes 31, 32, 33 and 34 arranged in a bridge configuration well known in the art. The bridge or conductive path between the node 28 at the junction of the anodes of diodes 31 and 32 and the node 29 at the junction of the cathodes of diodes 33 and 34 will conduct current responsive to current being induced in secondary windings of the transformer.

In FIGURE 2, a relay 30 is placed in the conductive path between the nodes 28 and 29 respectively. A potentiometer or variable resistance 40 is placed across the secondary windings in order to calibrate the differential of current in the primary windings of the transformer with the threshold of actuating response of the relay 30.

In the preferred embodiment of this invention, the resistance 40 is placed in parallel with the rectifying network to facilitate calibration of a differential of currents in the primary windings with the threshold of current necessary to actuate the relay.

In the full wave rectifying network, each of the diodes 31, 32, 33 and 34 can be either a selenium or germanium type. However, selenium is preferred because of its more pronounced nonlinear impedance characteristics. Pronounced nonlinearity of impedance in the diodes is preferred in order to utilize this nonlinearity in selectively narrowing the range between the actuating and deactuating limits of current in the bistable component (relay 40 in the FIGURE 2 embodiment or the silicon controlled rectifier in the FIGURE 3 embodiment) across the bridge portion of the full wave rectifier while calibrating a value in this range with a threshold of differential of current magnitude in the opposed primary windings by choosing a value of resistance 40.

In FIGURE 2, the shunt resistance 60 is placed across the secondary windings. This shunt resistance 60 has an impedance at least an order of magnitude less than the effective impedance of the calibrating resistor 50 together with the impedance of the rectifying network and its bridge reactance across the secondary windings. In series with the shunt resistor 60 is a timing mechanism 61 operable to open circuit the shunt resistor 60 from across the secondary windings of the transformer responsive to a predetermined lapse of time. This predetermined lapse of time corresponds to the time necessary to start up the motors 16 and 17. The timer or timing mechanism 61 is of a configuration well known in the electrical art, such as a bimetallic thermostatic relay.

Figure 3:
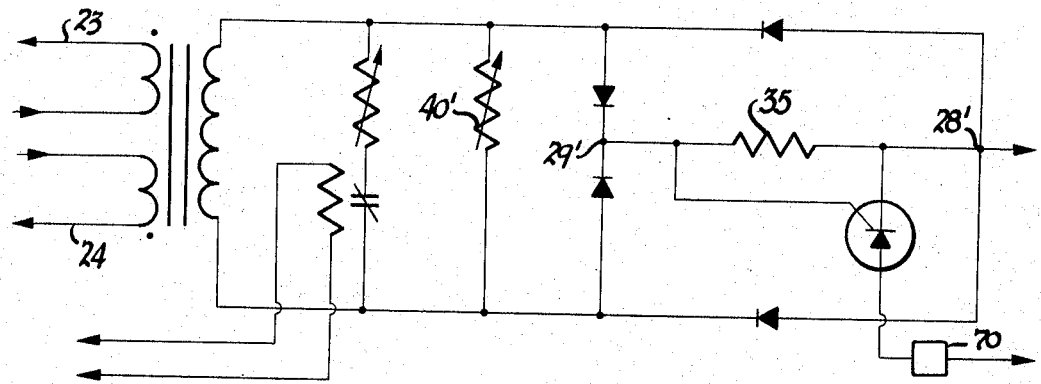
FIGURE 3 is a network for controlling the electrical motor shown in FIGURE 1 according to an alternative embodiment of this invention.

Referring to FIGURE 3, there is shown a network having an input and components similar to that of FIGURE 2 with the exceptions as noted hereinbelow. Across the terminals 28' and 29', which correspond to the nodes 28 and 29 in FIGURE 2, instead of having an inductive relay whose reactance is balanced by a parallel capacitor, there is instead shown in FIGURE 3 a resistance in parallel with the control to cathode path of a silicon control rectifier. In series with the silicon control rectifier and connected to the anode thereof is a safety switch 70 similar to the safety switch shown in FIGURE 2 (that is actuated by the relay 30 in FIGURE 2). The resistance 35 across the terminals 28' and 29' is of a value such that when the drop across the resistor reaches a predetermined threshold, the passage of current in the cathode to ground path (which is parallel to the drop across the resistor 35) of the silicon controlled rectifier is such as to actuate the safety switch 70 so as to turn off one of the motors 16, 17. The resistor 40' across the secondary windings of the transformer of FIGURE 3 functions in a manner similar to the resistor 40. However, instead of calibrating the threshold of actuation of a relay with respect to the differential of current between currents 23 and 24 in the primary windings of the transformer, as is accomplished in the network shown in FIGURE 2, the resistance 40' in the network shown in FIGURE 3 calibrates the threshold voltage required in the drop across the resistor 35 with the differential of opposed currents 23 and 24 in the primary windings of the transformer shown in FIGURE 3 with the threshold of current required in the cathode to ground path of the silicon controlled rectifier in order to actuate the safety circuit 70 to shut off one of the motors 16, 17.

All of the components shown in FIGURES 2 and 3 are isolated from contact with the fluid in the fluid system portion shown in FIGURE 1.

*Operation*

Referring to the schematic of the portion of the fluid system shown in FIGURE 1, when a back pressure or flow against the output of one of the compressors (as shown by the dotted arrow) occurs, the electric motor driving that particular compressor has an increased load. This increased load is reflected in an increase in magnitude of the difference of current from the same phases between the plurality of electric motors driving the plurality of compressors in parallel flow. Where two motors are involved, this differential of current is reflected as a difference in current between the currents 23 and 24 referred to in the networks of FIGURES 2 and 3.

Referring to FIGURE 2, this increase in magnitude of the differential of amplitudes of the currents 23, 24 results in a current being induced in the secondary windings of the transformer. A portion of this current will flow through the calibrating resistor 40 and a portion of it will flow across the four-way rectifying network of diodes 31, 32, 33 and 34. Across the bridge portion of the diode bridge, that is between the nodes 28 and 29, a current will flow, actuating the relay 40. When relay 40 is actuated, safety switch 70 is actuated to turn off one of the motors driving the compressors. One of the advantages of the present invention is that it doesn't make any difference which of the motors is turned off. For example if the motor being overloaded or overdriven is turned off, that obviously will prevent that stall of that motor. Yet while this motor is turned off the stall of the other motor driving the other compressor cannot occur because of back pressure against that motor since that compressor is the only source of pressure in that portion of the system while the other motor is shut off. On the other hand, if the motor other than the one being overdriven is shut off, that will also prevent a stall condition in the overdriven motor. This condition occurs because, with the other compressor turned off, so is the source of back pressure creating the overloaded condition. This causes that back pressure to subside, thereby preventing stall in the previously overdriven motor.

Referring to FIGURE 3, the operation of the network thereshown is similar to the operation of the network shown in FIGURE 2, except that instead of actuating a relay across the bridge of the rectifying network of diodes, a silicon controlled rectifier is actuated in such a manner as to cause a safety switch to actuate thereby causing the turning off of one of the two motors.

Summary

From the foregoing description it can be seen that with this invention the applicant has provided means for preventing the stall of electric motors used in driving parallel fluid compressors. This is done by either actuating a relay or a silicon controlled rectifier to turn off one of the motors responsive to back pressure against one of the compressors. Current from the same phase of each of the motors is fed into opposed primary windings of a transformer. Secondary windings of the transformer have induced energy responsive to a differential of current from the motors in the primary windings. This differential arises when one of the motors is overloaded due to back pressure of fluid against the compressor it drives. A full-wave rectifying bridge communicates with the secondary windings. The actuating coil of the relay, or the control electrode to cathode portion of the silicon controlled rectifier, is across this bridge, and is responsive to current induced in the secondary windings. A resistive load is across the secondary windings of the transformer and calibrates the energy to actuate the relay to a preselected differential of current in the primary windings. A shunt across the secondary windings is deactuatable responsive to a timer to condition the device for operation after the motors are started. Other than the compressor itself, none of the components of this invention are in direct contact, but instead are insulated from contact with fluid in the fluid system.

I claim:

1. In combination, a plurality of fluid compressors in parallel fluid feed lines to a common fluid output, electrical motors driving said compressors, and apparatus for preventing the stall of an electrical motor driving one of said plurality of fluid compressors comprising:
   a pair of primary windings on a transformer having opposed electrical polarity;
   means feeding current from the same phase of each of a pair of motors driving a pair of said plurality of compressors to said opposed primary windings of said transformer in a manner such that one current is opposed in direction to the other but in phase therewith;
   secondary winding means for said transformer providing a current therein responsive to a differential in magnitude of the currents in the primary windings of the transformer;
   a full wave rectifying network across the secondary winding means of said transformer having a bridge output portion;
   a variable electrical impedance across said secondary winding means operable to calibrate the current induced in said secondary winding means with a predetermined threshold of differential of magnitude of current between the opposed currents in the primary windings of said transformer;
   and bi-stable means connected to said bridge portion of said rectifying network operable thereby to turn off one of said motors responsive to the current in said secondary winding means rising above a level corresponding to said predetermined threshold.

2. In the apparatus of claim 1, a shunt across the secondary windings of said transformer deactuable responsive to a timer.

3. The apparatus of claim 1 wherein said bi-stable means comprises a relay operable to actuate a safety circuit for shutting down one of the motors responsive to the current in said secondary windings rising above a level corresponding to said threshold.

4. The apparatus of claim 1 wherein said bi-stable means comprises a silicon controlled rectifier having control and cathode portions across the bridge of said rectifying network and having its anode in series with a safety circuit operable to deactuate one of said motors responsive to a predetermined energy transfer across said bridge.

5. The apparatus of claim 1 wherein said full wave rectifier includes diodes having a substantially nonlinear impedance characteristic.

6. In an apparatus including a plurality of fluid compressors respectively in parallel fluid feed lines supplying fluid to a common fluid output and three-phase electrical motors respectively driving said compressors, the combination therewith of an anti-stall device for preventing stalling of one of said motors comprising a transformer, a pair of primary windings for said transformer having opposed electrical polarity, secondary winding means for said transformer, means supplying current of a given phase from one of said three-phase motors to one of said primary windings, means supplying current of the same phase from another of said motors to the other of said primary windings in a manner such that said currents are opposed in direction and therefore induce a differential current in said secondary winding means only when there is a difference in magnitude of the currents in said primary windings, a full wave rectifying network having an output portion and having an input portion connected to said secondary winding means for producing a direct current signal at said output portion responsive to said differential current, and bistable means coupled to said output portion and responsive to said signal at a threshold level thereof to turn off one of said motors.

7. The apparatus of claim 6 in which said bistable means comprises a relay having a coil connected to said output portion and having contacts operable to turn off said motor at said threshold level of said signal.

8. The apparatus of claim 6 in which said bistable means comprises circuit means connected to one of said motors for deactuating the same, and a silicon controlled rectifier having an output portion connected to said circuit means and an input portion connected to said output portion of said rectifying network, so that said silicon controlled rectifier actuates said circuit means to turn off said motor in response to said direct current signal at said threshold level thereof.

9. The apparatus of claim 6 in which said anti-stall device further includes variable impedance means connected to said secondary winding means for calibrating the current induced in said secondary winding means with a predetermined difference in the magnitude between the currents in the primary windings of said transformer.

References Cited

UNITED STATES PATENTS

| | | | |
|---|---|---|---|
| 1,665,313 | 4/1928 | Lewis | 317—27 |
| 2,811,019 | 10/1957 | Courtney | 230—17 |
| 3,048,745 | 8/1962 | Warrington | 317—27 |
| 3,133,502 | 5/1964 | Johnston | 103—11 |
| 3,202,877 | 8/1965 | Perrault | 317—27 X |
| 3,223,891 | 12/1965 | McClymont | 317—27 |
| 3,283,236 | 11/1966 | Legg | 318—474 X |
| 3,284,669 | 11/1966 | Boyd | 103—25 |

DONLEY J. STOCKING, *Primary Examiner.*

WILLIAM L. FREEH, *Assistant Examiner.*